United States Patent
Negi

(10) Patent No.: US 12,375,524 B2
(45) Date of Patent: Jul. 29, 2025

(54) IDENTIFYING PERSONALIZED OR ALTERED WEBPAGE CONTENT USING A BROWSER EXTENSION TOOL

(71) Applicant: Bank of America Corporation, Charlotte, NC (US)

(72) Inventor: Santosh Singh Negi, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 372 days.

(21) Appl. No.: 17/970,790

(22) Filed: Oct. 21, 2022

(65) Prior Publication Data

US 2024/0137387 A1 Apr. 25, 2024
US 2024/0236147 A9 Jul. 11, 2024

(51) Int. Cl.
*H04L 9/40* (2022.01)

(52) U.S. Cl.
CPC ........ *H04L 63/1483* (2013.01); *H04L 63/102* (2013.01); *H04L 63/20* (2013.01)

(58) Field of Classification Search
CPC .... H04L 63/1483; H04L 63/102; H04L 63/20
See application file for complete search history.

(56) References Cited

U.S. PATENT DOCUMENTS 9,680,866 B2  6/2017  Baddour et al.
10,084,779 B2  9/2018  Hunt et al.
10,148,681 B2  12/2018  Banerjee et al.
11,283,833 B2  3/2022  Ford
2016/0099963 A1*  4/2016  Mahaffey ............. H04L 63/166
726/25

(Continued)

FOREIGN PATENT DOCUMENTS

CN  113821754 B  *  8/2024  .......... G06F 16/958

OTHER PUBLICATIONS

Walch, Kathleen, "8 examples of AI personalization across industries," Nov. 16, 2020 https://www.techtarget.com/searchenterpriseai/feature/8-examples-of-AI-personalization-across-industries.

(Continued)

*Primary Examiner* — Alexander Lagor
*Assistant Examiner* — Shu Chun Gao
(74) *Attorney, Agent, or Firm* — Banner & Witcoff, Ltd.

(57) ABSTRACT

Aspects of the disclosure relate to identifying personalized or altered webpage content using a browser extension tool. The computing platform may analyze a requested webpage and extract details that describe the webpage request, a user profile associated with the webpage request, and/or the requested webpage. The computing platform may generate a plurality of simulated user profiles and a plurality of simulated webpage requests. The computing platform may compare the requested webpage to the webpages received in response to the simulated webpage requests to determine whether the webpage content on the requested webpage corresponds to the webpage content on the webpages received in response to the simulated webpage requests. Based on determining the webpage content on the requested webpage corresponds to the webpage content on the webpages received in response to the simulated webpage requests, the computing platform may determine the requested webpage does not contain personalized or altered webpage content.

20 Claims, 5 Drawing Sheets

(56) References Cited

U.S. PATENT DOCUMENTS

2020/0034917 A1* 1/2020 Wen .................... H04L 63/0421

OTHER PUBLICATIONS

Fayer, Leon, "Is ad personalization a threat to privacy?," Jun. 5, 2012 https://www.csoonline.com/article/2131795/is-ad-personalization-a-threat-to-privacy-.html.

Lakshman, Vivek, "The dangers of getting marketing personalisation wrong," May 11, 2020 https://www.itproportal.com/features/the-dangers-of-getting-marketing-personalisation-wrong/.

Martin, Erica, "Attackers Personalize Phishing—How About Your Training," Aug. 11, 2020 https://www.hoxhunt.com/blog/attackers-personalize-phishing-campaigns.

Catone, Josh, "Web 3.0: Is It About Personalization?," Feb. 4, 2008 https://readwrite.com/web_30_is_it_about_personalization/.

* cited by examiner

IDENTIFYING PERSONALIZED OR ALTERED WEBPAGE CONTENT USING A BROWSER EXTENSION TOOL

BACKGROUND

Aspects of the disclosure relate to hardware and/or software for identifying personalized or altered webpage content using a browser extension tool. In particular, one or more aspects of the disclosure may further relate to analyzing a webpage request, generating a plurality of simulated webpage requests, and comparing the requested webpage to a plurality of webpages received in response to the simulated webpage requests to determine whether the requested webpage contains personalized or altered webpage content that may be different from the webpage content displayed on the webpages received in response to the simulated webpage requests.

Enterprise organizations may permit users associated with the enterprise organization to access webpage content (e.g., to further and/or complete enterprise organization procedures, operations, or the like). In doing so, users associated with the enterprise organization may encounter webpage content that may have undergone personalization and/or alteration. Webpage content personalization and/or alteration may tailor webpage content to appeal to different users who may access the webpage content (e.g., based on learned user preferences, user demographics, or the like). In some instances, undetected webpage content personalization and/or alteration may threaten the security of the enterprise organization (e.g., may lead to phishing attacks, may lure a user toward malicious webpage content, may promote inaccurate information, or the like). However, current enterprise organization security protocols might not permit an enterprise organization to determine whether webpage content has been personalized and/or altered, identify the personalized and/or altered webpage content, and/or generate security strategies to protect against the proliferation of personalized and/or altered webpage content.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with identifying personalized or altered webpage content using a browser extension tool.

In accordance with one or more embodiments, a method may comprise, at a computing device including one or more processors and memory, receiving, from a computing device, a request to access a webpage. The method may comprise granting access to the webpage. The method may comprise determining whether the webpage was previously requested. The method may comprise, based on determining the webpage was not previously requested, analyzing the webpage. The method may comprise identifying details that describe the webpage request and details that describe a user profile associated with the computing device. The method may comprise modifying, using at least one machine learning algorithm, the details that describe the webpage request and the details that describe the user profile. The method may comprise generating a plurality of simulated user profiles based on the modified details that describe the user profile. The method may comprise generating, based on the plurality of simulated user profiles and the modified details that describe the webpage request, a plurality of simulated webpage requests to access the webpage. The method may comprise transmitting the plurality of simulated webpage requests. The method may comprise receiving access to a plurality of webpages indicated in the plurality of simulated webpage requests. The method may comprise comparing webpage content on the webpage to webpage content on the plurality of webpages. The method may comprise determining whether the webpage content on the webpage is the same as the webpage content on the plurality of webpages. The method may comprise, based on determining the webpage content on the webpage is the same as the webpage content on the plurality of webpages, displaying a notification indicating the webpage does not contain personalized content.

In accordance with one or more embodiments, a computing platform may comprise at least one processor, a communication interface communicatively coupled to the at least one processor, and memory storing computer-readable instructions that, when executed by the at least one processor, cause the computing platform to receive, from a computing device, a request to access a webpage. The computing platform may grant access to the webpage. The computing platform may determine whether the webpage was previously requested. The computing platform may, based on determining the webpage was not previously requested, analyze the webpage. The computing platform may identify details that describe the webpage request and details that describe a user profile associated with the computing device. The computing platform may modify, using at least one machine learning algorithm, the details that describe the webpage request and the details that describe the user profile. The computing platform may generate a plurality of simulated user profiles based on the modified details that describe the user profile. The computing platform may generate, based on the plurality of simulated user profiles and the modified details that describe the webpage request, a plurality of simulated webpage requests to access the webpage. The computing platform may transmit the plurality of simulated webpage requests. The computing platform may receive access to a plurality of webpages indicated in the plurality of simulated webpage requests. The computing platform may compare webpage content on the webpage to webpage content on the plurality of webpages. The computing platform may determine whether the webpage content on the webpage is the same as the webpage content on the plurality of webpages. The computing platform may, based on determining the webpage content on the webpage is the same as the webpage content on the plurality of webpages, display a notification indicating the webpage does not contain personalized content.

In accordance with one or more embodiments, one or more non-transitory computer-readable media storing instructions that, when executed by a computing platform comprising at least one processor, memory, and a communication interface, cause the computing platform to receive, from a computing device, a request to access a webpage. The instructions, when executed, may cause the computing platform to grant access to the webpage. The instructions, when executed, may cause the computing platform to determine whether the webpage was previously requested. The instructions, when executed, may cause the computing platform to, based on determining the webpage was not previously requested, analyze the webpage. The instructions, when executed, may cause the computing platform to identify details that describe the webpage request and details that describe a user profile associated with the computing device. The instructions, when executed, may cause the computing platform to modify, using at least one machine learning algorithm, the details that describe the webpage request and the details that describe the user profile. The instructions, when executed, may cause the computing platform to generate a plurality of simulated user profiles based on the modified details that describe the user profile. The instructions, when executed, may cause the computing platform to generate, based on the plurality of simulated user profiles and the modified details that describe the webpage request, a plurality of simulated webpage requests to access the webpage. The instructions, when executed, may cause the computing platform to transmit the plurality of simulated webpage requests. The instructions, when executed, may cause the computing platform to receive access to a plurality of webpages indicated in the plurality of simulated webpage requests. The instructions, when executed, may cause the computing platform to compare webpage content on the webpage to webpage content on the plurality of webpages. The instructions, when executed, may cause the computing platform to determine whether the webpage content on the webpage is the same as the webpage content on the plurality of webpages. The instructions, when executed, may cause the computing platform to, based on determining the webpage content on the webpage is the same as the webpage content on the plurality of webpages, display a notification indicating the webpage does not contain personalized content.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1A:
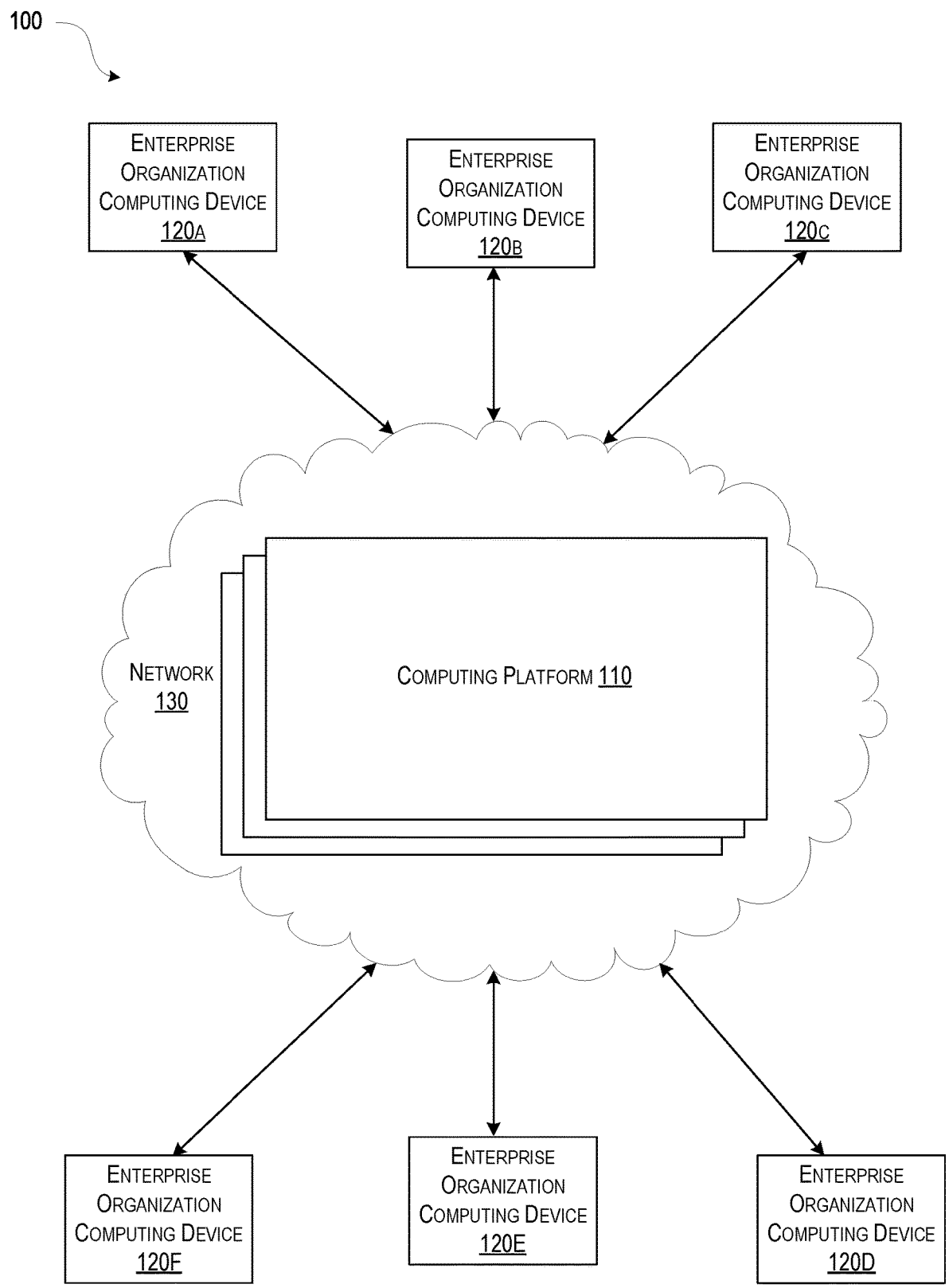
FIG. 1A depicts an illustrative example of a computer system for identifying personalized or altered webpage content using a browser extension tool, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current enterprise organization security protocols might not permit an enterprise organization to determine whether webpage content has been personalized and/or altered, identify the personalized and/or altered webpage content, and/or generate security protocols to protect against the proliferation of personalized and/or altered webpage content. Accordingly, proposed herein is a solution to the problem described above that includes identifying personalized or altered webpage content using a browser extension tool. For example, an enterprise organization computing device may request access to a webpage, wherein the webpage request may be associated with a user profile. The enterprise organization computing device may receive, from a web browser, access to the requested webpage. A browser extension embedded within the web browser may use a browser extension tool to analyze the webpage request and the webpage received in response to the webpage request (e.g., the requested webpage). The browser extension tool may identify details that describe the user profile and details that describe the generation of the webpage request.

The browser extension tool may modify the details and may use the modified details to generate a plurality of simulated user profiles. Each simulated user profile may generate a simulated webpage request (e.g., requesting the same webpage indicated in the webpage request generated by the user profile, or the like). Each simulated user profile may receive a webpage in response to the simulated webpage request. The browser extension tool may use a controller to compare the webpage content on the requested webpage to the webpage content on the webpages received in response to the simulated webpage requests. Based on determining the webpage content on the requested webpage is the same as the webpage content on the webpages received in response to the simulated webpage requests, then the controller may determine that the requested webpage might not contain personalized and/or altered webpage content. Alternatively, based on determining the webpage content on the requested webpage is different from the webpage content on the webpages received in response to the simulated webpage requests, then the controller may determine that the requested webpage may contain personalized and/or altered webpage content.

Computer Architecture

FIG. 1A depicts an illustrative example of computer system 100 that may be used for identifying, in real-time or near real-time, personalized or altered webpage content using a browser extension tool, in accordance with one or more aspects described herein. Computer system 100 may comprise one or more computing devices including at least computing platform 110 and enterprise organization computing devices 120a-120f. While FIG. 1A depicts more than one enterprise organization computing device (e.g., enterprise organization computing devices 120a-120f), each of enterprise organization computing devices 120a-120f may be configured in accordance with the features described herein. While the description herein may refer to enterprise organization computing device 120, the functions described may also be performed by any one of enterprise organization computing devices 120a-120f. While FIG. 1A depicts enterprise organization computing devices 120a-120f, more or fewer enterprise organization computing devices may exist within computer system 100. Six enterprise organization computing devices are depicted in FIG. 1A for illustration purposes only and are not meant to be limiting.

Enterprise organization computing device 120 may be associated with a user profile (e.g., that corresponds to an agent within the enterprise organization, or the like) and may generate a plurality of webpage requests. Enterprise organization computing device 120 may launch a web browser and may transmit the webpage requests via the web browser. Enterprise organization computing device 120 may receive access to the requested webpage from the browser. Enterprise organization computing device 120 may also receive a notification (e.g., a pop-up notification window, a drop-down alert notification, or the like) wherein the notification may indicate that the requested webpage may contain personalized and/or altered webpage content. In some instances, the notification may indicate that the requested webpage might not contain personalized and/or altered webpage content.

Each one of enterprise organization computing devices 120a-120f may be configured to communicate with computing platform 110 through network 130. Network 130 may include one or more sub-networks (e.g., local area networks (LANs), wide area networks (WANs), or the like). In some arrangements, computer system 100 may include additional computing devices and networks that are not depicted in FIG. 1A, which may also be configured to interact with computing platform 110. Furthermore, computer system 100 may include a local network configured to interconnect each of the computing devices comprising computing platform 110.

Computing platform 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable user electronic device(s), network personal computer(s) (PC), minicomputer(s), mainframe computer(s), distributed computing environment(s), and the like. Computing platform 110 may include computing hardware and software that may host various data and applications for performing tasks of the centralized entity and interacting with enterprise organization computing device 120 and/or additional computing devices.

Computing platform 110 may receive communication from enterprise organization computing device 120. In particular, computing platform 110 may receive, from enterprise organization computing device 120, requests to determine whether the requested webpage was previously received and/or whether a webpage content database contains data that describes the requested webpage. Computing platform 110 may permit enterprise organization computing device 120 to access the webpage content database and parse the data stored therein. In some instances, computing platform 110 may receive, from enterprise organization computing device 120, details that describe the analysis of the current webpage request and may store the details within the webpage content database.

In some arrangements, computing platform 110 may include and/or be part of enterprise information technology infrastructure and may host a plurality of enterprise applications, enterprise databases, and/or other enterprise resources. Such applications may be executed on one or more computing devices included in computing platform 110 using distributed computing technology and/or the like. In some instances, computing platform 110 may include a relatively large number of servers that may support operations of the enterprise organization, such as a financial institution. Computing platform 110, in this embodiment, may generate a single centralized ledger, which may be stored in database 112 (shown in FIG. 1), for data received from enterprise organization computing device 120.

In some instances, enterprise organization computing device 120 may be configured to receive and transmit information corresponding to webpage requests through particular channels and/or applications associated with computing platform 110. The webpage requests submitted by enterprise organization computing device 120 may initiate the performance of particular computational functions at computing platform 110 and/or enterprise organization computing device 120, such as the analysis of the requested webpage.

Figure 1B:
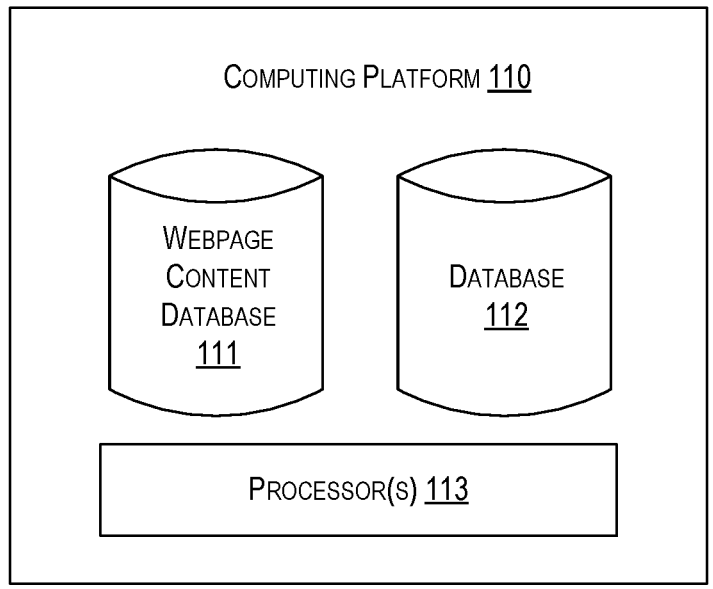
FIG. 1B depicts an illustrative example of a computing platform that may be used for identifying personalized or altered webpage content using a browser extension tool, in accordance with one or more example embodiments.

FIG. 1B depicts the example computing platform 110 of FIG. 1A that may be used for identifying, in real-time or near real-time, personalized or altered webpage content using a browser extension tool, in accordance with one or more aspects described herein. Computing platform 110 may use webpage content database 111, database 112, and/or processor(s) 113 to analyze at least one webpage request. Each computing device within computing platform 110 may contain database 112 and processor(s) 113, which may be stored in the memory of the one or more computing devices of computing platform 110. Through execution of computer-readable instructions stored in memory, the computing devices of computing platform 110 may be configured to perform functions of the centralized entity and store the data generated during the performance of such functions in webpage content database 111 and/or database 112.

Webpage content database 111 may contain data that describes previously received webpage requests, data that describes the analysis of the previously received webpage requests, and/or indications of whether the previously requested webpages contain personalized and/or altered webpage content. Webpage content database 111 may further contain data extracted from each previously requested webpage (e.g., webpage content parsed from each previously requested webpage, Cartesian coordinates that indicate the location of the webpage content, media content parsed from each previously requested webpage, Cartesian coordinates that indicate the location of the media content, or the like). In some instances, webpage content database 111 may comprise data that describes the user profile associated with each previously received webpage request (e.g., enterprise organization access credentials associated with the user profile, a role within the enterprise organization associated with the user profile, a level of authorization within the enterprise organization associated with the user profile, or the like). Webpage content database 111 may receive data from enterprise organization computing device 120 (e.g., data that may describe the current webpage request, data extracted from the requested webpage, data that may correspond to the user profile from which the webpage request originated, or the like) and may store the received data.

Figure 1C:
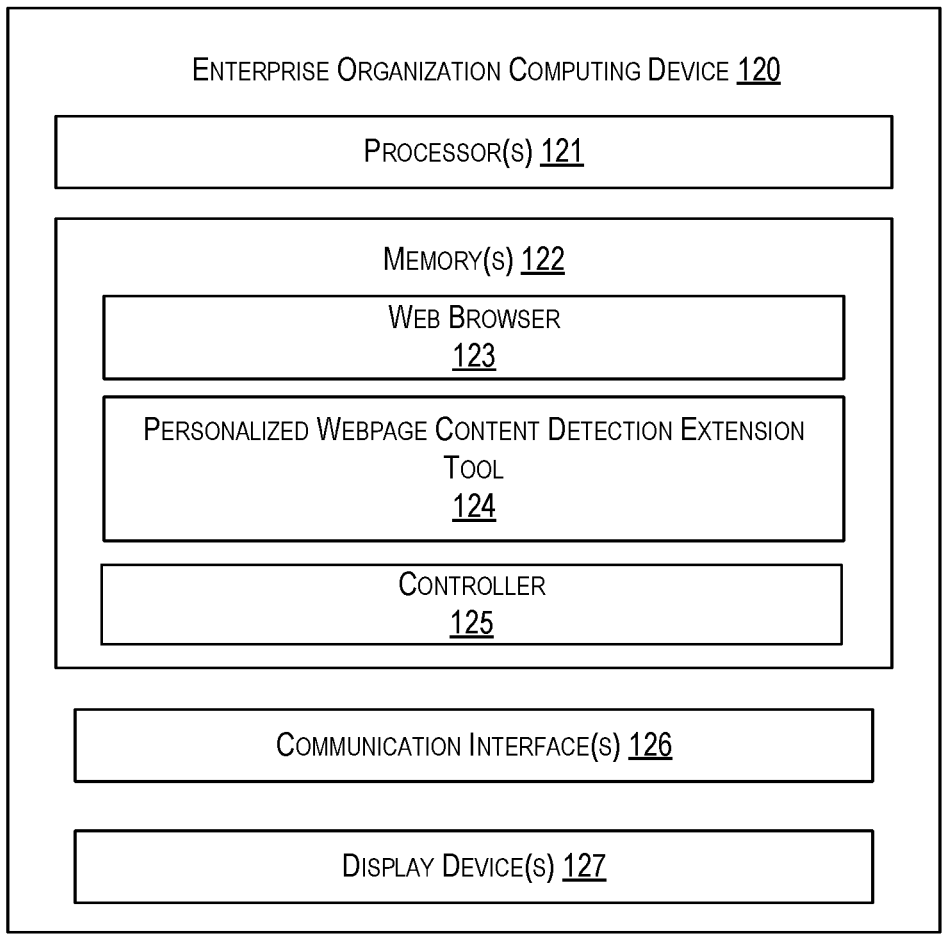
FIG. 1C depicts an illustrative example of an enterprise organization computing device that may be used for identifying personalized or altered webpage content using a browser extension tool, in accordance with one or more example embodiments.

FIG. 1C depicts the example enterprise organization computing device 120 of FIG. 1A that may be used for identifying, in real-time or near real-time, personalized or altered webpage content using a browser extension tool, in accordance with one or more aspects described herein. Enterprise organization computing device 120 may use processor(s) 121, memory(s) 122, web browser 123, personalized webpage content detection extension tool 124, controller 125, communication interface(s) 126, and/or display device(s) 127 to identify details that describe each webpage request, identify details that describe the user profile from which the webpage request originated, and/or extract details from the requested webpage.

Processor(s) 121 may facilitate the transmission of data between the computing devices within enterprise organization computing device 120 as well as the transmission of data between enterprise organization computing device 120 and computing platform 110. Processor(s) 121 may facilitate the display of notifications via display device(s) 127.

Memory(s) 122 may perform at least one function described herein. In particular, memory(s) 122, and the computing devices associated therewith, may analyze the webpage request and extract data from the requested webpage to determine whether the requested webpage contains personalized and/or altered webpage content.

Web browser 123 may receive a request to access a webpage. Web browser 123 may communicate with a plurality of web servers (not pictured in FIGS. 1A-1C) to retrieve a location of the requested webpage and to provide the requested webpage to enterprise organization computing device 120 (e.g., via display device(s) 127, or the like). Web browser 123 may instruct personalized webpage content detection extension tool 124 to analyze the requested webpage (e.g., based on web browser 123 retrieving the requested webpage from the plurality of servers and displaying the requested webpage via display device(s) 127, or the like).

Personalized webpage content detection extension tool 124 may receive, from web browser 123, instructions to analyze the requested webpage. Personalized webpage content detection extension tool 124 may parse the requested webpage to determine whether webpage content database 111 contains data that describes the requested webpage (e.g., data that indicates whether the requested webpage was previously analyzed, whether the requested webpage contains personalized and/or altered webpage content, or the like). Personalized webpage content detection extension tool 124 may generate a plurality of simulated user profiles and may transmit, from each simulated user profile and to web browser 123, a plurality of simulated webpage requests. Personalized webpage content detection extension tool 124 may receive, from web browser 123, access to the webpages received in response to the simulated webpage requests.

Controller 125 may analyze the requested webpage and the webpages received in response to the simulated webpage requests. Controller 125 may compare the webpage content on the requested webpage to the webpage content on each webpage received in response to the simulated webpage requests. Controller 125 may determine, based on the comparison, whether the requested webpage contains personalized and/or altered webpage content. Controller 125 may generate a notification (e.g., a pop-up notification window, a drop-down notification alert, or the like) indicating whether the requested webpage contains personalized and/or altered webpage content. In some instances, the notification may indicate that the requested webpage may contain personalized and/or altered webpage content and may indicate a location (e.g., using Cartesian coordinates, or the like) of the personalized and/or altered webpage content. Alternatively, the notification may indicate that the requested webpage might not contain personalized and/or altered webpage content.

Communication interface(s) 126 may facilitate communication between computing platform 110 and enterprise organization computing device 120. Communication interface(s) 126 may transmit, to computing platform 110, requests to determine whether a user profile may be authorized to generate and transmit webpage requests, requests to determine whether the requested webpage was previously received, and/or requests to determine whether webpage content database 111 contains data that describes the requested webpage. Communication interface(s) 126 may also transmit, to webpage content database 111, data that describes the analysis of the current webpage request to be stored within webpage content database 111.

Display device(s) 127 may display at least one requested webpage and/or a notification generated by controller 125. In some instances, display device(s) 127 may display an alert (e.g., a network alert, or the like) indicating the user profile associated with enterprise organization computing device 120 might not be authorized to generate and transmit webpage requests.

Figure 2A:
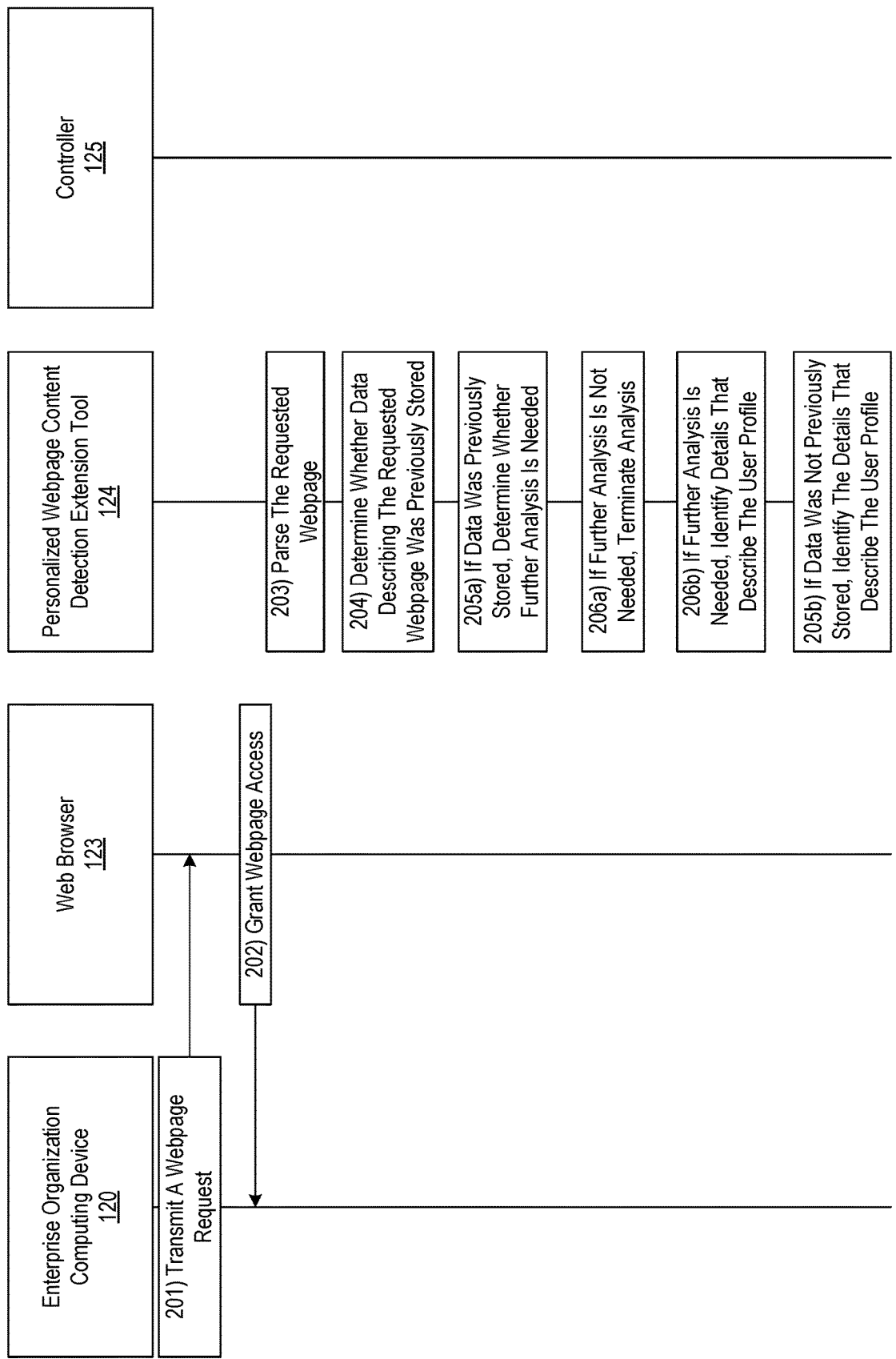
FIGS. 2A-2B depict an illustrative event sequence for identifying personalized or altered webpage content using a browser extension tool, in accordance with one or more example embodiments.
Figure 2B:
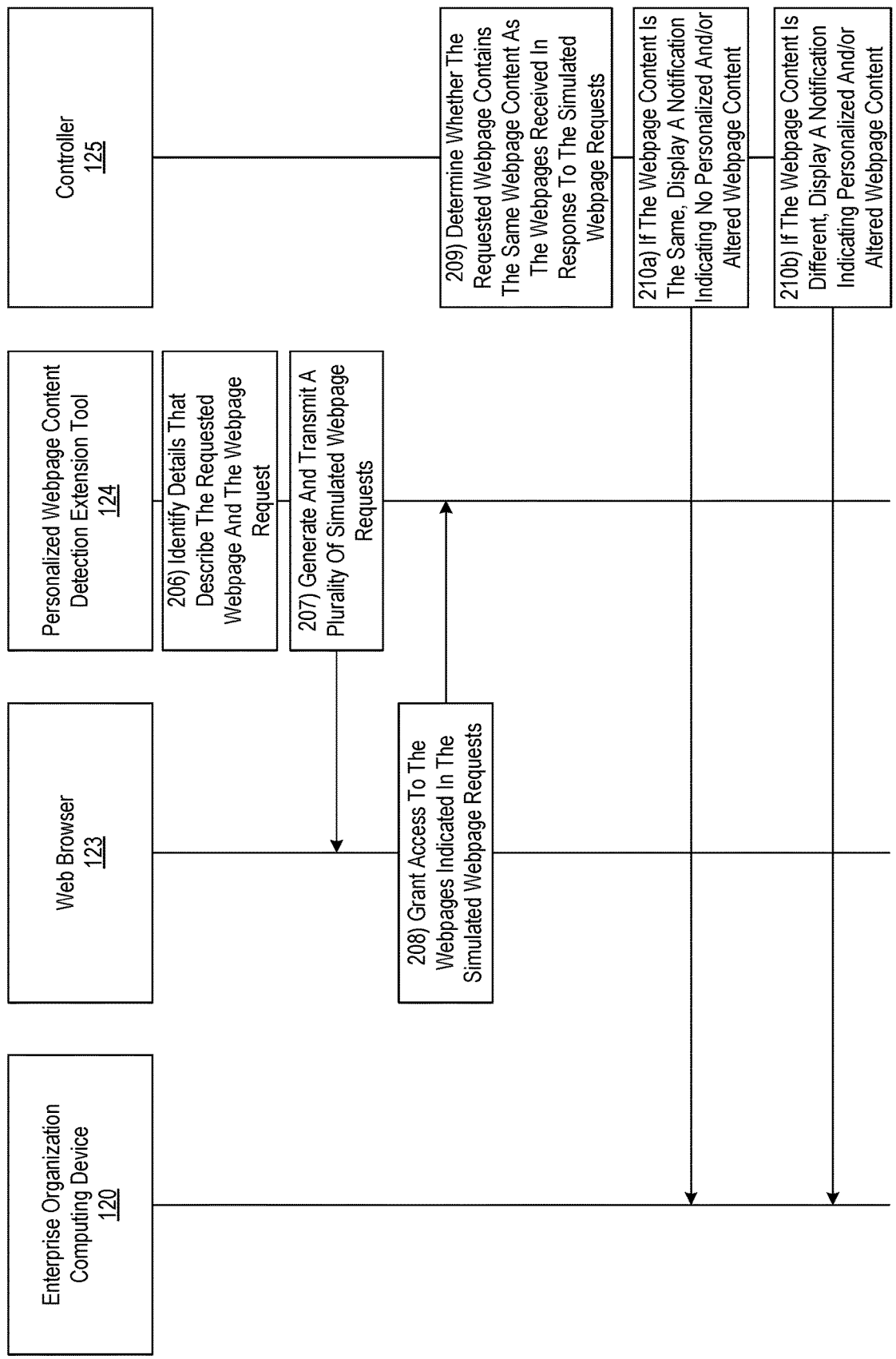

Identifying Personalized or Altered Webpage Content Using a Browser Extension Tool FIGS. 2A-2B depict an illustrative event sequence for identifying, in real-time or near real-time, personalized or altered webpage content using a browser extension tool, in accordance with one or more aspects described herein. While aspects described with respect to FIGS. 2A-2B may include the evaluation of a single webpage request, a plurality of webpage requests may be evaluated (e.g., in parallel) without departing from the present disclosure.

Referring to FIG. 2A, at step 201, enterprise organization computing device 120 may generate a request to access a webpage. To do so, enterprise organization computing device 120 may access a user profile (e.g., that corresponds to an enterprise organization agent, or the like). Access to the user profile may be based on enterprise organization access credentials (e.g., enterprise organization login credentials, enterprise organization authorization credentials, or the like). Enterprise organization computing device 120 may provide the enterprise organization access credentials that correspond to the user profile.

Communication interface(s) 126 may transmit the received enterprise organization access credentials across network 130 and to computing platform 110 to determine whether the enterprise organization access credentials may be permitted to generate and transmit webpage requests. Communication interface(s) 126 may compare the received enterprise organization access credentials to enterprise organization authorization data stored in database 112 (e.g., user profiles that may be authorized to generate and transmit webpage requests, enterprise organization access credentials that may correspond to each authorized user profile, or the like).

In some instances, communication interface(s) 126 may determine the enterprise organization access credentials might not be authorized to generate and transmit webpage requests (e.g., based on parsing the enterprise organization authorization data stored in database 112, or the like). In such instances, communication interface(s) 126 may display, via display device(s) 127, a notification indicating enterprise organization computing device 120 might not be authorized to generate and transmit webpage requests and, as such, the current webpage request might not be processed and/or fulfilled.

Alternatively, communication interface(s) 126 may determine the enterprise organization access credentials may be authorized to generate and transmit webpage requests. As such, enterprise organization computing device 120 may initiate communication with web browser 123 (e.g., using network 130, or the like). Enterprise organization computing device 120 may use at least one peripheral device (e.g., a mouse, a keyboard, a microphone, or the like) to communicate the webpage request to web browser 123.

At step 202, web browser 123 may receive the webpage request from enterprise organization computing device 120 and may store the webpage request within webpage content database 111. Web browser 123 may establish a connection with a plurality of web servers, wherein each web server may host a plurality of webpages. Web browser 123 may identify the web server that hosts the requested webpage and may establish a connection between the identified web server and enterprise organization computing device 120. Web browser 123 may initiate transmission of the requested webpage from the identified web server to enterprise organization computing device 120. Web browser 123 may instruct personalized webpage content detection extension tool 124 to analyze the requested webpage.

At step 203, personalized webpage content detection extension tool 124 may parse the requested webpage. In particular, personalized webpage content detection extension tool 124 may identify a webpage address and/or webpage content associated with the requested webpage. Personalized webpage content detection extension tool 124 may transmit, via communication interface(s) 126 and to computing platform 110, a request to access webpage content database 111 to determine whether the parsed information corresponds to at least one previously requested webpage stored within webpage content database 111.

In some instances, personalized webpage content detection extension tool 124 may receive, from computing platform 110, a notification indicating denial of the request to access webpage content database 111. As such, enterprise organization computing device 120 may transmit (e.g., to authorized personnel within the enterprise organization, or the like) a request for manual analysis of the requested webpage. Alternatively, personalized webpage content detection extension tool 124 may receive, from computing platform 110, access to webpage content database 111.

At step 204, personalized webpage content detection extension tool 124 may access webpage content database 111 to determine whether the requested webpage was previously requested and/or analyzed. Personalized webpage content detection extension tool 124 may parse the data within webpage content database 111 to determine whether at least one of the webpage address and/or the webpage content that corresponds to (e.g., matches, is the same as, is within a predetermined range of, or the like) the requested webpage also corresponds to at least one previously requested webpage.

If, at step 204, personalized webpage content detection extension tool 124 determines that at least one of the webpage address and/or the webpage content that corresponds to the requested webpage also corresponds to at least one previously requested webpage, then, at step 205a, personalized webpage content detection extension tool 124 may retrieve, from webpage content database 111, the data that describes the at least one previously requested webpage. Personalized webpage content detection extension tool 124 may parse the retrieved data to determine whether the previously requested webpage contains personalized and/or altered webpage content and to determine whether further analysis of the webpage request may be required.

In some instances, the retrieved content may further include metadata that may correspond to the retrieved data (e.g., a date during which the data that corresponds to the at least one previously requested webpage may have been generated, a predetermined range of dates during which the at least one previously requested webpage might not require further analysis by personalized webpage content detection extension tool 124, or the like). Personalized webpage content detection extension tool 124 may consider the metadata to determine whether to further analyze the requested webpage.

If, at step 205a, the metadata indicates that the requested webpage might not require further analysis, then, at step 206a, personalized webpage content detection extension tool 124 may terminate the analysis of the webpage request. In some instances, controller 125 may generate a notification indicating that the requested webpage might not contain personalized and/or altered webpage content and may display the notification via display device(s) 127.

Alternatively, if, at step 205a, the metadata indicates that the requested webpage may require further analysis, then, at step 206b, personalized webpage content detection extension tool 124 may initiate further analysis of the requested webpage. Personalized webpage content detection extension tool 124 may identify details that describe the user profile associated with enterprise organization computing device 120 that generated the webpage request (e.g., enterprise organization access credentials that correspond to the user profile, enterprise organization login credentials that correspond to the user profile, a position within the enterprise organization that corresponds to the user profile, an enterprise organization authorization level that corresponds to the user profile, or the like). Personalized webpage content detection extension tool 124 may transmit, via communication interface(s) 126, the details that describe the user profile and may store the details that describe the user profile within webpage content database 111 (e.g., such that the details that describe the user profile may be used to further analyze the current webpage request and/or subsequent webpage requests, or the like).

Similarly, if, at step 204, personalized webpage content detection extension tool 124 determines that both the webpage address and the webpage content that correspond to the requested webpage fail to correspond to the previously requested webpages, then, at step 205b, personalized webpage content detection extension tool 124 may further analyze the requested webpage. To do so, personalized webpage content detection extension tool 124 may identify details that describe the user profile associated with enterprise organization computing device 120 that generated the webpage request (e.g., enterprise organization access credentials that correspond to the user profile, enterprise organization login credentials that correspond to the user profile, a position within the enterprise organization that corresponds to the user profile, an enterprise organization authorization level that corresponds to the user profile, or the like). Personalized webpage content detection extension tool 124 may transmit, via communication interface(s) 126, the details that describe the user profile and may store the details that describe the user profile within webpage content database 111 (e.g., such that the details that describe the user profile may be used to further analyze the current webpage request and/or subsequent webpage requests, or the like).

Referring to FIG. 2B and at step 206, personalized webpage content detection extension tool 124 may extract, from the webpage request, details that describe the generation of the webpage request (e.g., a geographic location of enterprise organization computing device 120 when the webpage request was generated and transmitted, a network address of enterprise organization computing device 120 when the webpage request was generated and transmitted, a time at which enterprise organization computing device 120 generated and transmitted the webpage request, a type of internet connection that enterprise organization computing device 120 utilized to generate and transmit the webpage request, or the like).

Personalized webpage content detection extension tool 124 may also parse the requested webpage to identify details that describe the location of the webpage content on the requested webpage. To do so, personalized webpage content detection extension tool 124 may generate a coordinate plane (e.g., a Cartesian coordinate plane, or the like) and may superimpose the coordinate plane upon the requested webpage. In some instances, the coordinate plane might not be displayed (e.g., might not be visible, or the like) via display device(s) 127 of enterprise organization computing device 120. Personalized webpage content detection extension tool 124 may identify, using the coordinate plane, coordinates (e.g., Cartesian coordinates, or the like) that correspond to the location of the webpage content. Personalized webpage content detection extension tool 124 may transmit, via communication interface(s) 126, the details that describe the generation of the webpage request and the details that describe the location of the webpage content, and may store the details within webpage content database 111.

At step 207, personalized webpage content detection extension tool 124 may generate a plurality of simulated webpage requests. Each simulated webpage request may request access to the requested webpage, but may be associated with a simulated user profile of a plurality of simulated user profiles. Each simulated user profile may correspond to details that may be different from the details that describe the user profile associated with enterprise organization computing device 120 that generated the webpage request. Furthermore, each simulated webpage request may correspond to details that may be different from the details that describe the generation of the webpage request.

To generate the plurality of simulated user profiles, personalized webpage content detection extension tool 124 may modify (e.g., using a machine learning model executing at least one machine learning algorithm, or the like) the details that describe the user profile associated with enterprise organization computing device 120 that generated the webpage request. The at least one machine learning model may parse (e.g., as input, as training data, or the like) the details that describe the user profile. In some instances, the at least one machine learning model may further receive (e.g., as training data, or the like) at least one data generation routine that may be used to modify (e.g., within a predetermined range, or the like) the training data. The at least one machine learning model may execute the at least one data generation routine to generate modified details that describe each simulated user profile.

In some instances, personalized webpage content detection extension tool 124 may generate modified enterprise organization access credentials that correspond to each simulated user profile, modified enterprise organization login credentials that correspond to each simulated user profile, a position within the enterprise organization that corresponds to each simulated user profile, an enterprise organization authorization level that corresponds to each simulated user profile, or the like. Personalized webpage content detection extension tool 124 may transmit and store the modified details associated with each simulated user profile within webpage content database 111 (e.g., via communication interface(s) 126, or the like).

Furthermore, to generate the plurality of simulated webpage requests, personalized webpage content detection extension tool 124 may modify (e.g., using the at least one machine learning model, or the like) the details that describe the generation of the webpage request. In some instances, personalized webpage content detection extension tool 124 may generate a modified geographic location of enterprise organization computing device 120 when the simulated webpage request was generated and transmitted, generate a modified network address of enterprise organization computing device 120 when the simulated webpage request was generated and transmitted, generate a modified time at which enterprise organization computing device 120 generated and transmitted the simulated webpage request, generate a modified type of internet connection that enterprise organization computing device 120 utilized to generate and transmit the simulated webpage request, or the like. Personalized webpage content detection extension tool 124 may transmit and store the modified details associated with each simulated webpage request within webpage content database 111 (e.g., via communication interface(s) 126, or the like).

Each simulated webpage request may correspond to a simulated user profile and may request access to the same webpage to which the user profile requested access (as described in step 201). Personalized webpage content detection extension tool 124 may transmit the plurality of simulated webpage requests to web browser 123.

At step 208, web browser 123 may receive and store the plurality of simulated webpage requests (e.g., within webpage content database 111, or the like). Web browser 123 may identify the web server(s), of the plurality of web servers, that hosts the webpage indicated in each simulated webpage request (e.g., the webpage requested by the user profile, or the like). Web browser 123 may establish a connection between the identified web server(s) and enterprise organization computing device 120, and may initiate transmission of the webpage indicated in the simulated webpage request from the identified web server(s) to enterprise organization computing device 120. In some instances, web browser 123 may instruct controller 125 to analyze the webpages received in response to the simulated webpage requests.

At step 209, controller 125 may analyze the webpages received in response to the simulated webpage requests to determine whether the webpage content on the requested webpage corresponds to (e.g., is the same as, is within a predetermined range of, or the like) the webpage content on the webpages received in response to the simulated webpage requests. Controller 125 may parse each webpage received in response to the simulated webpage requests to identify details that describe the location of the webpage content on each webpage received in response to the simulated webpage requests. For each webpage received in response to the simulated webpage requests, controller 125 may generate a coordinate plane (e.g., a Cartesian coordinate plane, or the like) and may superimpose the coordinate plane upon the webpage received in response to the simulated webpage request such that the coordinate plane might not be visible via display device(s) 127. Controller 125 may use the coordinate plane to identify coordinates (e.g., Cartesian coordinates, or the like) that correspond the location of webpage content on each webpage received in response to the simulated webpage requests. Controller 125 may transmit and store, within webpage content database 111 (e.g., via communication interface(s) 126, or the like), the coordinates associated with each webpage received in response to the simulated webpage requests.

Controller 125 may retrieve, from webpage content database 111, the coordinates that indicate the location(s) of the webpage content on the requested webpage. Controller 125 may compare the coordinates associated with the requested webpage to the coordinates associated with the webpages received in response to the simulated webpage requests to determine whether the webpages received in response to the simulated webpage requests display the same webpage content as the requested webpage at the same coordinates as the requested webpage.

If, at step 209, controller 125 determines that the webpage content displayed on the requested webpage (e.g., based on the coordinates that correspond to requested webpage, or the like) is the same webpage content displayed on the webpages received in response to the simulated webpage requests, then, at step 210a, controller 125 may determine that the requested webpage might not contain personalized and/or altered webpage content. As such, controller 125 may generate a notification indicating that the requested webpage might not contain personalized and/or altered webpage content and may display the notification using display device(s) 127. In some instances, controller 125 may also transmit a notification to the enterprise organization indicating that the requested webpage might not contain personalized and/or altered webpage content. Additionally or alternatively, controller 125 may transmit and store, via communication interface(s) 126 and within webpage content database 111, the notification indicating that the requested webpage might not contain personalized and/or altered webpage content.

Alternatively, if, at step 209, controller 125 determines that the webpage content displayed on the requested webpage (e.g., based on the coordinates that correspond to the requested webpage, or the like) might not be the same as the webpage content displayed on the webpages received in response to the simulated webpage requests, then, at step 210b, controller 125 may determine that the requested webpage may contain personalized and/or altered webpage content. As such, controller 125 may generate a notification indicating that the requested webpage may contain personalized and/or altered webpage content. The notification may further indicate the coordinates on the requested webpage and the coordinates on the webpages received in response to the simulated webpage requests where the webpage content may be different. Additionally or alternatively, the notification may indicate (e.g., highlight, or the like) particular webpage content that may be different between the requested webpage and the webpages received in response to the simulated webpage requests.

The notification may also indicate differences between the user profile associated with the webpage request and the simulated user profile associated with the simulated webpage request. In particular, the notification may indicate differences between the details that describe the user profile and/or the generation of the webpage request and the details that describe the simulated user profile and/or the generation of the simulated webpage request. Controller 125 may use the differences in the details to determine at least one reason why the webpage content on the requested webpage may be different from the webpage content on the webpages received in response to the simulated webpage requests (e.g., the simulated user profile may be associated with a higher enterprise organization authorization level when compared to the enterprise organization authorization level associated with the user profile, the enterprise organization position associated with the simulated user profile may be a more senior position when compared to the enterprise organization position associated with the user profile, or the like).

Controller 125 may display the notification using display device(s) 127. In some instances, controller 125 may also transmit a notification to the enterprise organization indicating that the requested webpage may contain personalized and/or altered webpage content. Additionally or alternatively, controller 125 may transmit and store, via communication interface(s) 126 and within webpage content database 111, the notification indicating that the requested webpage may contain personalized and/or altered webpage content.

In some instances, the enterprise organization may generate at least one security protocol to protect enterprise organization computing devices 120a-120f from accessing webpage content that may be personalized and/or altered. The enterprise organization may store the at least one security protocol within database 112 such that enterprise organization computing devices 120a-120f may retrieve and run the at least one security protocol. Additionally or alternatively, the enterprise organization may instruct personalized webpage content detection extension tool 124 to execute the at least one security protocol during the analysis of the webpage request discussed herein.

Figure 3:
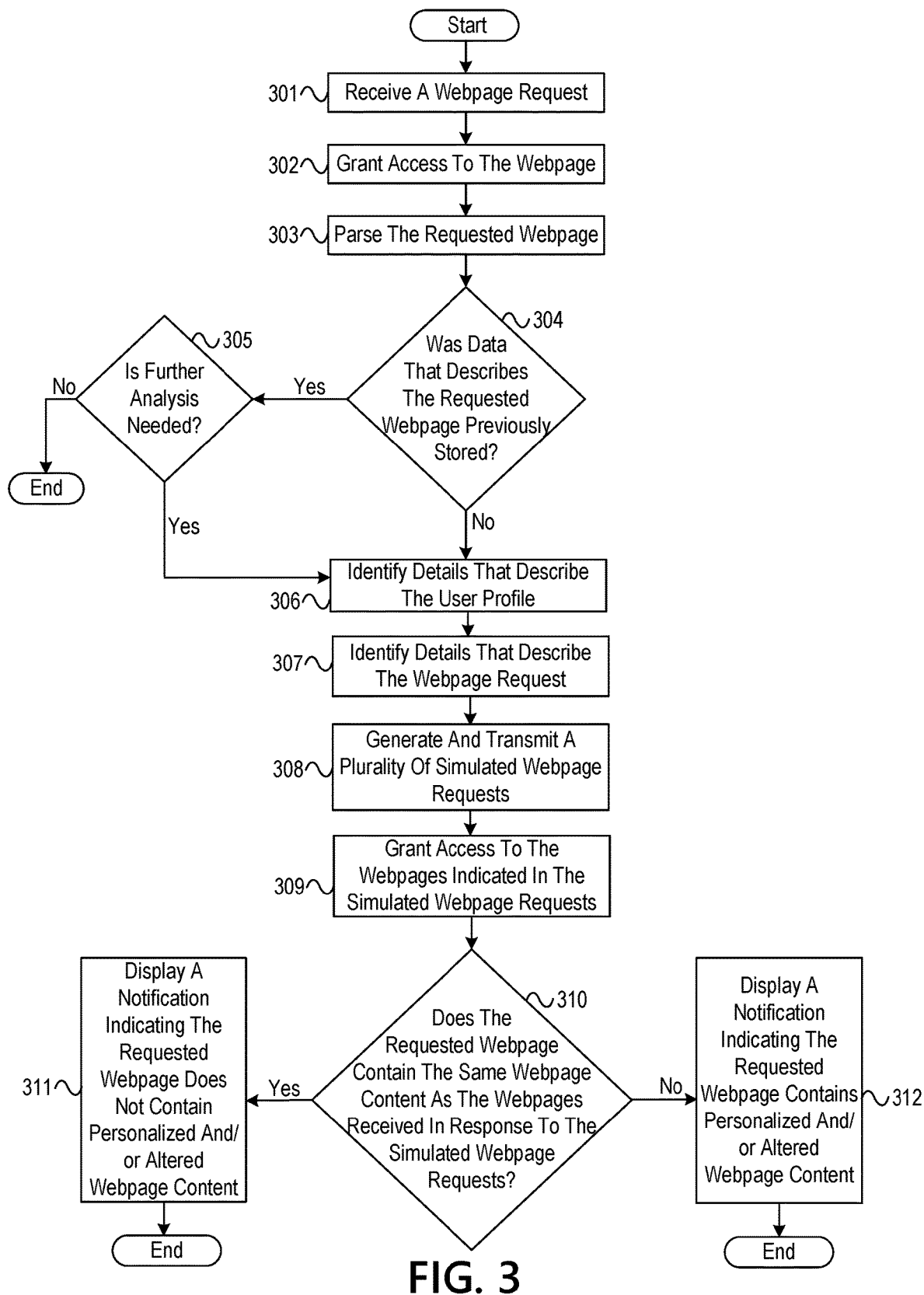
FIG. 3 depicts an illustrative method for identifying personalized or altered webpage content using a browser extension tool, in accordance with one or more example embodiments.

FIG. 3 depicts an illustrative event sequence for identifying, in real-time or near real-time, personalized or altered webpage content using a browser extension tool, in accordance with one or more aspects described herein. While aspects described with respect to FIG. 3 may include the analysis of a single webpage request, a plurality of webpage requests may be evaluated (e.g., in parallel) without departing from the present disclosure. The steps shown may be performed in the order shown, in a different order, more steps may be added, or one or more steps may be omitted, without departing from the disclosure. In some examples, one or more steps may be performed simultaneously with other steps shown and described. One or more steps shown in FIG. 3 may be performed in real-time or near real-time.

At step 301, web browser 123 may receive a webpage request from enterprise organization computing device 120. The webpage request may correspond to a user profile associated with enterprise organization computing device 120. Web browser 123 may establish a network connection with a plurality of web servers, wherein each web server may host a plurality of webpages.

At step 302, web browser 123 may identify the web server that hosts the requested webpage and may establish a connection between the identified web server and enterprise organization computing device 120 to initiate transmission of the requested webpage from the identified web server to enterprise organization computing device 120 (e.g., to grant enterprise organization computing device 120 access to the requested webpage, or the like).

At step 303, personalized webpage content detection extension tool 124 may parse the requested webpage to identify a webpage address and/or webpage content associated with the requested webpage.

At step 304, personalized webpage content detection extension tool 124 may use the parsed information to determine whether the requested webpage was previously requested and/or analyzed. To do so, personalized webpage content detection extension tool 124 may parse the data within webpage content database 111 to determine whether at least one of the webpage address and/or the webpage content that corresponds to (e.g., matches, is the same as, is within a predetermined range of, or the like) the requested webpage also corresponds to at least one previously requested webpage.

If, at step 304, personalized webpage content detection extension tool 124 determines that at least one of the webpage address and/or the webpage content that corresponds to the requested webpage also corresponds to at least one previously requested webpage, then, at step 305, personalized webpage content detection extension tool 124 may retrieve, from webpage content database 111, the data that describes the at least one previously requested webpage as well as metadata associated with the retrieved data to determine whether further analysis of the requested webpage may be required.

At step 305, personalized webpage content detection extension tool 124 may determine, based on parsing the retrieved data and the metadata, whether further analysis of the requested webpage may be needed. Personalized webpage content detection extension tool 124 may determine, based on the parsing, that the requested webpage may contain personalized and/or altered webpage content and that the requested webpage might not require further analysis. As such, personalized webpage content detection extension tool 124 may terminate the analysis described herein.

Alternatively, if, at step 305, personalized webpage content detection extension tool 124 determines, based on analyzing the metadata, that the requested webpage may contain personalized and/or altered webpage content that may require further analysis, then, at step 306, personalized webpage content detection extension tool 124 may identify details that describe the user profile associated with enterprise organization computing device 120 that generated the webpage request.

Similarly, if, at step 304, personalized webpage content detection extension tool 124 determines that both the webpage address and the webpage content that correspond to the requested webpage fail to correspond to the previously requested webpages, then, at step 306, personalized webpage content detection extension tool 124 may identify details that describe the user profile associated with enterprise organization computing device 120 that generated the webpage request.

At step 307, personalized webpage content detection extension tool 124 may extract, from the webpage request, details that describe the generation of the webpage request. Personalized webpage content detection extension tool 124 may also parse the requested webpage to identify details that describe the location (e.g., using Cartesian coordinates, or the like) of the webpage content on the requested webpage.

At step 308, personalized webpage content detection extension tool 124 may generate a plurality of simulated webpage requests. Each simulated webpage request may request access to the requested webpage, but may be associated with a simulated user profile of a plurality of simulated user profiles. Each simulated user profile may correspond to details that may be different from the details that describe the user profile associated with enterprise organization computing device 120 that generated the webpage request. Furthermore, each simulated webpage request may correspond to details that may be different from the details that describe the generation of the webpage request.

Each simulated webpage request may correspond to a simulated user profile and may request access to the webpage to which the user profile requested access. Personalized webpage content detection extension tool 124 may transmit the plurality of simulated webpage requests to web browser 123.

At step 309, web browser 123 may receive the plurality of simulated webpage requests. Web browser 123 may identify the web server(s), of the plurality of web servers, that host the webpage indicated in each simulated webpage request. Web browser 123 may establish a connection between the identified web server(s) and enterprise organization computing device 120, and may initiate transmission of the webpage indicated in the simulated webpage request from the identified web server(s) to enterprise organization computing device 120.

At step 310, controller 125 may analyze the webpages received in response to the simulated webpage requests to determine whether the webpage content on the requested webpage corresponds to the webpage content on the webpages received in response to the simulated webpage requests. Controller 125 may parse the webpages received in response to the simulated webpage requests to identify details that describe the location (e.g., using Cartesian coordinates, or the like) of the webpage content on the webpages received in response to the simulated webpage requests. Controller 125 may compare the coordinates associated with the requested webpage to the coordinates associated with the webpages received in response to the simulated webpage requests to determine whether the webpages received in response to the simulated webpage requests display the same webpage content as the requested webpage at the same coordinates as the requested webpage.

If, at step 310, controller 125 determines that the webpage content displayed on the requested webpage (e.g., based on the coordinates that correspond to requested webpage, or the like) is the same webpage content displayed on the webpages received in response to the simulated webpage requests, then, at step 311, controller 125 may determine that the requested webpage might not contain personalized and/or altered webpage content. Controller 125 may generate a notification indicating that the requested webpage might not contain personalized and/or altered webpage content and may display the notification using display device(s) 127.

Alternatively, if, at step 310, controller 125 determines that the webpage content displayed on the requested webpage (e.g., based on the coordinates that correspond to the requested webpage, or the like) might not be the same as the webpage content displayed on the webpages received in response to the simulated webpage requests, then, at step 312, controller 125 may determine that the requested webpage may contain personalized and/or altered webpage content. Controller 125 may generate a notification indicating that the requested webpage may contain personalized and/or altered webpage content. The notification may further indicate the coordinates on the requested webpage and the coordinates on each simulated webpage where the webpage content may be different.

As a result, the proposed solution may provide the following benefits: 1) real-time, or near real-time, analysis of webpage requests; 2) real-time, or near real-time, generation of simulated webpage requests based on a plurality of simulated user profiles, wherein each simulated user profile may be different from a user profile from which the webpage request originated; and 3) real-time, or near real-time, comparison of the requested webpage and the webpages received in response to the simulated webpage requests to determine whether the requested webpage contains the same webpage content as the webpages received in response to the simulated webpage requests.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a user computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   at a computing platform including one or more processors and memory:
      receiving, from a computing device, a request to access a webpage;
      granting access to the webpage;
      determining whether the webpage was previously requested;
      based on determining the webpage was not previously requested, analyzing the webpage;
      identifying details that describe the webpage request and details that describe a user profile associated with the computing device;
      modifying, using at least one machine learning algorithm, the details that describe the webpage request, wherein modifying the details that describe the webpage request include modifying details that describe generation of the webpage request including at least a geographic location of the computing device;
      modifying, using the at least one machine learning algorithm, the details that describe the user profile, wherein modifying the details that describe the user profile includes modifying organization access credentials and an organization authorization level associated with the user profile;
      generating a plurality of simulated user profiles based on the modified details that describe the user profile;
      generating, based on the plurality of simulated user profiles and the modified details that describe the webpage request, a plurality of simulated webpage requests to access the webpage;
      transmitting the plurality of simulated webpage requests;
      receiving access to a plurality of webpages indicated in the plurality of simulated webpage requests;
      comparing webpage content on the webpage to webpage content on the plurality of webpages;
      determining whether the webpage content on the webpage is the same as the webpage content on the plurality of webpages; and
      based on determining the webpage content on the webpage is the same as the webpage content on the plurality of webpages, displaying a notification indicating the webpage does not contain personalized content.

2. The method of claim 1, wherein the determining whether the webpage was previously requested comprises:
   parsing a webpage address associated with the webpage;
   parsing a webpage content database, wherein the webpage content database comprises a plurality of webpage addresses that correspond to previously requested webpages; and
   based on determining the webpage address associated with the webpage is stored in the webpage content database, displaying a notification indicating the webpage was previously requested.

3. The method of claim 2, further comprising, based on determining the webpage address associated with the webpage is not stored in the webpage content database, displaying a notification indicating the webpage was not previously requested.

4. The method of claim 1, wherein the details that describe the webpage request further comprise at least one of:
a network location of the computing device;
a time associated with generation of the webpage request; or
a connection type associated with transmission of the webpage request.

5. The method of claim 1, wherein the details that describe the user profile associated with the computing device further comprise at least one of:
enterprise organization login credentials that correspond to the user profile; or
a position within the enterprise organization that corresponds to the user profile.

6. The method of claim 1, further comprising determining a first plurality of Cartesian coordinates that corresponds to a location of the webpage content on the webpage.

7. The method of claim 6, further comprising determining a second plurality of Cartesian coordinates that corresponds to a location of the webpage content on the plurality of webpages.

8. The method of claim 7, wherein the comparing the webpage content on the webpage to the webpage content on the plurality of webpages comprises:
comparing the first plurality of Cartesian coordinates to the second plurality of Cartesian coordinates; and
determining whether the first plurality of Cartesian coordinates is the same as the second plurality of Cartesian coordinates.

9. The method of claim 8, further comprising determining the webpage content on the webpage is the same as the webpage content on the plurality of webpages based on determining the first plurality of Cartesian coordinates is the same as the second plurality of Cartesian coordinates.

10. The method of claim 9, further comprising determining the webpage content on the webpage is different from the webpage content on the plurality of webpages based on determining the first plurality of Cartesian coordinates is different the second plurality of Cartesian coordinates.

11. The method of claim 10, further comprising, based on determining the webpage content on the webpage is different from the webpage content on the plurality of webpages, displaying a notification indicating the webpage contains personalized content.

12. The method of claim 11, wherein the displaying the notification indicating the webpage contains personalized content further comprises identifying Cartesian coordinates, of the first plurality of Cartesian coordinates and the second plurality of Cartesian coordinates, that correspond to the differences between the webpage content on the webpage and the webpage content on the plurality of webpages.

13. A computing platform comprising:
at least one processor;
a communication interface communicatively coupled to the at least one processor; and
memory storing computer-readable instructions that, when executed by the at least one processor, cause the computing platform to:
receive, from a computing device, a request to access a webpage;
grant access to the webpage;
determine whether the webpage was previously requested;
based on determining the webpage was not previously requested, analyze the webpage;
identify details that describe the webpage request and details that describe a user profile associated with the computing device;
modify, using at least one machine learning algorithm, the details that describe the webpage request, wherein modifying the details that describe the webpage request include modifying details that describe generation of the webpage request including at least a geographic location of the computing device;
modifying, using the at least one machine learning algorithm, the details that describe the user profile, wherein modifying the details that describe the user profile includes modifying organization access credentials and an organization authorization level associated with the user profile;
generate a plurality of simulated user profiles based on the modified details that describe the user profile;
generate, based on the plurality of simulated user profiles and the modified details that describe the webpage request, a plurality of simulated webpage requests to access the webpage;
transmit the plurality of simulated webpage requests;
receive access to a plurality of webpages indicated in the plurality of simulated webpage requests;
compare webpage content on the webpage to webpage content on the plurality of webpages;
determine whether the webpage content on the webpage is the same as the webpage content on the plurality of webpages; and
based on determining the webpage content on the webpage is the same as the webpage content on the plurality of webpages, display a notification indicating the webpage does not contain personalized content.

14. The computing platform of claim 13, wherein the determining whether the webpage was previously requested further causes the computing platform to:
parse a webpage address associated with the webpage;
parse a webpage content database, wherein the webpage content database comprises a plurality of webpage addresses that correspond to previously requested webpages; and
based on determining the webpage address associated with the webpage is stored in the webpage content database, display a notification indicating the webpage was previously requested.

15. The computing platform of claim 13, wherein the details that describe the webpage request further comprise at least one of:
a network location of the computing device;
a time associated with generation of the webpage request; or
a connection type associated with transmission of the webpage request.

16. The computing platform of claim 13, wherein the details that describe the user profile associated with the computing device further comprise at least one of:
enterprise organization login credentials that correspond to the user profile; or
a position within the enterprise organization that corresponds to the user profile.

17. One or more non-transitory computer-readable media storing instructions that, when executed by a computing platform comprising at least one processor, memory, and a communication interface, cause the computing platform to:
- receive, from a computing device, a request to access a webpage;
- grant access to the webpage;
- determine whether the webpage was previously requested;
- based on determining the webpage was not previously requested, analyze the webpage;
- identify details that describe the webpage request and details that describe a user profile associated with the computing device;
- modify, using at least one machine learning algorithm, the details that describe the webpage request, wherein modifying the details that describe the webpage request include modifying details that describe generation of the webpage request including at least a geographic location of the computing device;
- modifying, using the at least one machine learning algorithm, the details that describe the user profile, wherein modifying the details that describe the user profile includes modifying organization access credentials and an organization authorization level associated with the user profile;
- generate a plurality of simulated user profiles based on the modified details that describe the user profile;
- generate, based on the plurality of simulated user profiles and the modified details that describe the webpage request, a plurality of simulated webpage requests to access the webpage;
- transmit the plurality of simulated webpage requests;
- receive access to a plurality of webpages indicated in the plurality of simulated webpage requests;
- compare webpage content on the webpage to webpage content on the plurality of webpages;
- determine whether the webpage content on the webpage is the same as the webpage content on the plurality of webpages; and
- based on determining the webpage content on the webpage is the same as the webpage content on the plurality of webpages, display a notification indicating the webpage does not contain personalized content.

18. The non-transitory computer-readable media of claim 17, wherein the instructions, when executed, further cause the computing platform determine a first plurality of Cartesian coordinates that corresponds to a location of the webpage content on the webpage.

19. The non-transitory computer-readable media of claim 18, wherein the instructions, when executed, further cause the computing platform determine a second plurality of Cartesian coordinates that corresponds to a location of the webpage content on the plurality of webpages.

20. The non-transitory computer-readable media of claim 19, wherein the comparing the webpage content on the webpage to the webpage content on the plurality of webpages further causes the computing platform to:
- compare the first plurality of Cartesian coordinates to the second plurality of Cartesian coordinates; and
- determine whether the first plurality of Cartesian coordinates is the same as the second plurality of Cartesian coordinates.

* * * * *